United States Patent
Duan et al.

(10) Patent No.: US 7,647,527 B2
(45) Date of Patent: Jan. 12, 2010

(54) APPARATUS AND METHOD FOR COLLECTING AND DISPLAYING DATA FOR REMOTE DIAGNOSTICS

(75) Inventors: Diana J. Duan, Sunnyvale, CA (US); Paul Yen-Chin Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 11/329,899

(22) Filed: Jan. 11, 2006

(65) Prior Publication Data

US 2007/0174710 A1  Jul. 26, 2007

(51) Int. Cl.
*G06F 11/00* (2006.01)
(52) U.S. Cl. .......................................... 714/25; 714/38
(58) Field of Classification Search .................. 714/38, 714/37, 25; 717/124, 126, 128
See application file for complete search history.

(56) References Cited

U.S. PATENT DOCUMENTS

| | | | | |
|---|---|---|---|---|
| 5,758,062 A | * | 5/1998 | McMahon et al. | 714/38 |
| 6,115,704 A | * | 9/2000 | Olson et al. | 707/3 |
| 6,170,065 B1 | * | 1/2001 | Kobata et al. | 714/7 |
| 6,963,875 B2 | | 11/2005 | Moore et al. | |
| 6,988,139 B1 | * | 1/2006 | Jervis et al. | 709/226 |
| 7,117,411 B2 | * | 10/2006 | McNeely et al. | 714/724 |
| 7,191,364 B2 | * | 3/2007 | Hudson et al. | 714/38 |
| 2003/0191911 A1 | * | 10/2003 | Kleinschnitz et al. | 711/154 |
| 2003/0225936 A1 | * | 12/2003 | Felske | 709/328 |
| 2004/0103118 A1 | * | 5/2004 | Irving et al. | 707/104.1 |
| 2004/0167906 A1 | | 8/2004 | Smith et al. | |

\* cited by examiner

*Primary Examiner*—Dieu-Minh Le
(74) *Attorney, Agent, or Firm*—Canady & Lortz LLP; Bradley K. Lortz

(57) ABSTRACT

Systems and methods for automating database table and application data collection into one process to facilitate remote diagnostics of a computer problem are disclosed. A customized batch file is created by a remote support technician that can be run on a user computer that has the actual data to be gathered for the computer problem to be diagnosed. An output data file is created by the running batch file compiling problem diagnosis data from the user computer. The data file can then be viewed via a single viewing process that displays the application and database data of the data file through a single GUI and allows easy viewing manipulation of that data through the GUI. Because the database table data may be saved in a string delimited format with table field names saved with it, the database program is not needed in order to view the tables.

18 Claims, 7 Drawing Sheets

APPARATUS AND METHOD FOR COLLECTING AND DISPLAYING DATA FOR REMOTE DIAGNOSTICS

BACKGROUND OF THE INVENTION

1. Field of the Invention

The present invention relates to a method, system, and program for remotely diagnosing operating problems of a computer system running an operating system or application program. Particularly, the present invention relates to a method, system, and program for remotely diagnosing operating problems of a computer system running a database application program.

2. Description of the Related Art

Assisting software customers troubleshoot problems occurring in the operation of computer programs and hardware is an unfortunate but inevitable task that must be supported by computer software and hardware companies. There are many factors which can make resolving such computer problems more difficult. For example, because the user computer with the problem is remotely located from the support technician, it is often difficult to accurately diagnose and resolve computer problems; often an unskilled user must be blindly talked through arcane procedures by the support technician to diagnose and resolve the problem. Typically, this process can be very time-consuming and may yield an inaccurate diagnosis. At the same time, it would not be cost effective to send a technician to the user computer in most situations. The difficulty of remotely troubleshooting computer problems is further compounded by the variety of software and hardware which may exist in a user system; the support system must be prepared to deal with unique hardware and software configurations for each user.

A known technique for performing remote diagnostics of computer problems involves a user granting remote user access to a support person. In that manner, the remote support technician may enter the supported computer system and directly perform diagnostics himself. However, from a user perspective, this approach poses a security risk; a person outside of the user organization will be granted high level security access and may access confidential information. Furthermore, in some cases, applying such a method may also violate U.S. or foreign security regulations, particularly if the support is provided from a service center in another country.

Another known technique for performing remote diagnostics of computer problems is for the support center to maintain a computer and software system that duplicates the user computer. In this case, the support center attempts to replicate the failure or other incident that is being investigated on the duplicated system so in order to identify the problem and develop a solution which can then be relayed to the user. However, this method can be difficult or impossible to implement in many cases due to the variety of computer hardware and software versions which may exist on the user system; it is virtually impossible to account for all permutations of hardware and software.

Other computer problems related to remote diagnostics of computer problems may involve specific common software applications, e.g. a networked database application, such as IBM's DB2. For example, troubleshooting a database application problem may require a support technician to review particular database table data in addition to application data. In this case, a user would be required to compile all the necessary information and communicate it to the remote support technician.

Conventional collection of database table data and application file data are performed as separate processes. A user must either manually create structured query language (SQL) command or use the database user interface to obtain database data in specific tables. Separately, another method must also be used to copy the required application data. With all the data now collected, yet another process is needed to combine the table and application data into a single archive, e.g. a zip file, so it can be communicated to the remote support technician. After the support technician receives the different sets of data (which come in different formats), he then must separately view the DB and application data in order to interpret them.

The process of collecting specific database table data, with different criteria each time, as well as other application data, can be very tedious, requiring a user to execute and manipulate multiple applications each time. Furthermore, viewing the database data typically requires a database program installed on the support technician's system so that table column definitions can be displayed along with the data. This usually requires that the definitions are available when the database data is retrieved. Finally, viewing of both the database data and the application data also involves separate processes for each data type, which makes analysis of both more tedious and time consuming. Some processes have been developed to facilitate the collection of data objects as well as remote diagnostics.

U.S. Pat. No. 6,963,875, issued Nov. 8, 2005 to Moore et al., discloses a persistent archive of a collection of data objects comprising a self-describing, infrastructure-independent representation of a logical structure for the collection and a self-describing, infrastructure-independent representation of the data objects. The archive is persistent in that it may be instantiated at an indefinite point in time in the future regardless of the state of technology at that time. A knowledge-based persistent archive of a collection of data objects comprises the foregoing two elements but also a self-describing, infrastructure-independent representation of knowledge relevant to the collection. Another embodiment of a knowledge-based persistent archive comprises at least one representation of a collection or the data objects, at least one self-describing, infrastructure-independent, or executable specification of one or more transformations relevant to the collection, and at least one self-describing, infrastructure-independent, or executable specification of one or more rules relevant to the collection.

U.S. patent application No. 2004/0167906, published Aug. 26, 2004 by Smith et al., discloses a method and a tool to simplify the analysis and maintenance of program products installed on plural computers. Product version information is gathered from each of a plurality of computers of a similar type. This information is then reorganized into one or more groups each containing the information gathered from a plurality of the computers such that the computers within each group have installed thereon program products the versions of which are upgrade compatible. The information in each group is used to guide the process of maintaining and upgrading the program products installed on the computers whose product information is within that group.

U.S. patent application No. 2003/0225936, published Dec. 4, 2003 by Felske, discloses an article of manufacture, method, and system for automatically collecting, formatting, parsing, and transferring data from a distributed control system (DCS) to a diagnosis/analysis program. The article of manufacture embodies an application interface program (API) which, when executed, performs the steps of: automatically collecting, formatting, and parsing process alarms from each DCS node; automatically collecting, formatting, and parsing operator actions from each DCS node using an SQL call; and automatically collecting, formatting, and parsing system monitor messages from each DCS node using an SQL call. The data may be parsed according to the time collection limits between when the API was last run and the current time. In one embodiment, the DCS is Foxboro's I/A DCS®, and the collected data is transferred by FTP for transmission over a network, such as the Internet, to a remote diagnosis/analysis program such as Honeywell's Control Performance Solution™ including Loop Scout™.

However, there is still a need in the art for systems and methods for efficient remote diagnostics of computer problems. Particularly, there is still a need in the art for such systems and methods that allow flexible retrieval of any log files along with product-specific database tables. There is also a need for such systems and methods to allow viewing collected logs and database tables via a single interface in order to diagnose a computer problem. As detailed hereafter, these and other needs are met by embodiments of the present invention.

SUMMARY OF THE INVENTION

The present invention is directed to systems and methods for automating database table and application data collection into one process to facilitate remote diagnostics of a computer problem. Embodiments of the invention may include two processes, a data collection designer and a data viewer. Embodiments of the invention may be used by a software defect support technician to get a snapshot of the customer system environment, at the time of a software failure, by collecting pertinent problem diagnosis data (e.g. database, environment, configuration, and logs) from the user computer system, and then use that information to perform analysis.

A customized batch file is created by a remote support technician that can be run on a user computer that has the actual data to be gathered for the computer problem to be diagnosed. An output data file is created by the running batch file compiling problem diagnosis data from the user computer (e.g. including application logs as well as database data). The data file can then be viewed via a single viewing process (e.g. in a parsing program) that displays the application and database data of the data file through a single graphical user interface (GUI) and allows easy viewing manipulation of that data through the GUI. Because the database table data may be saved in a string delimited format with table field names and/or definitions saved with it, the database program is not needed in order to view the tables.

A typical embodiment of the invention comprises a method including the steps of running a data collection designer software program on a support computer to create a batch file, the batch file including program instructions for generating a data file comprising problem diagnosis data for a software application running on a user computer and communicating the batch file to the user computer for execution on the user computer to generate the data file. In further embodiments, the data file is received from the user computer and a data viewer is invoked to display the problem diagnosis data in the data file. In addition, embodiments of the invention may include executing the batch file on the second computer to create the data file. The problem diagnosis data may be in a format viewable without requiring the software application to be running on a viewing computer.

In addition, embodiments of the invention may be applied where the software application comprises a database and the problem diagnosis data further comprises database tables collected from the database by the executed batch file. The database tables may be collected from the database base on criteria selected from the group consisting of time, table size, record specification, and column specification.

Further, the problem diagnosis data may comprise information stored in one or more application files associated with the software application. The problem diagnosis data from the one or more application files may be collected based on criteria selected from the group consisting of time, file size, and format. The one or more application files comprise a event log recording a state of the application software and/or an error log including information related to errors occurring in running the software application.

Similarly, embodiments of the invention may comprise a computer program embodied on a computer readable medium, including program instructions for running a data collection designer software program on a support computer to create a batch file, the batch file including program instructions for generating a data file comprising problem diagnosis data for a software application running on a user computer and program instructions for communicating the batch file to the user computer for execution on the user computer to generate the data file. Further embodiments may include program instructions for receiving the data file from the user computer and program instructions for invoking a data viewer to display the problem diagnosis data in the data file. Computer program embodiments of the invention may be further modified consistent with the method embodiments of the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

One aspect of the present invention involves a method to customize the creation of a data file (e.g. a single archive) to collect specific problem diagnosis data from a user computer system in order to analyze and diagnose a computer problem with a software application. Where the software application comprises a database, the problem diagnosis data may include one or more database tables in addition to information stored in one or more application files for the software application (e.g. error and/or event logs). The product of the process is batch file (i.e. a script file) customized to collect the appropriate data (based on the user description of the problem) when it is run on the user system.

The batch file is then communicated to the user and run on the user system. The output data file is created by the running batch file and includes all the problem diagnosis data. The user then communicates the data file back to the support technician. The received data file can be viewed via a single process (e.g. a parsing program) that will display the contents of the application files and database tables through a single graphical user interface (GUI) and allows manipulation of that data through the GUI. Since the database table data may be saved in a standard format (e.g. a string-delimited format) with table field names/definitions included, a full database program is not needed in order to view the tables.

Figure 1:
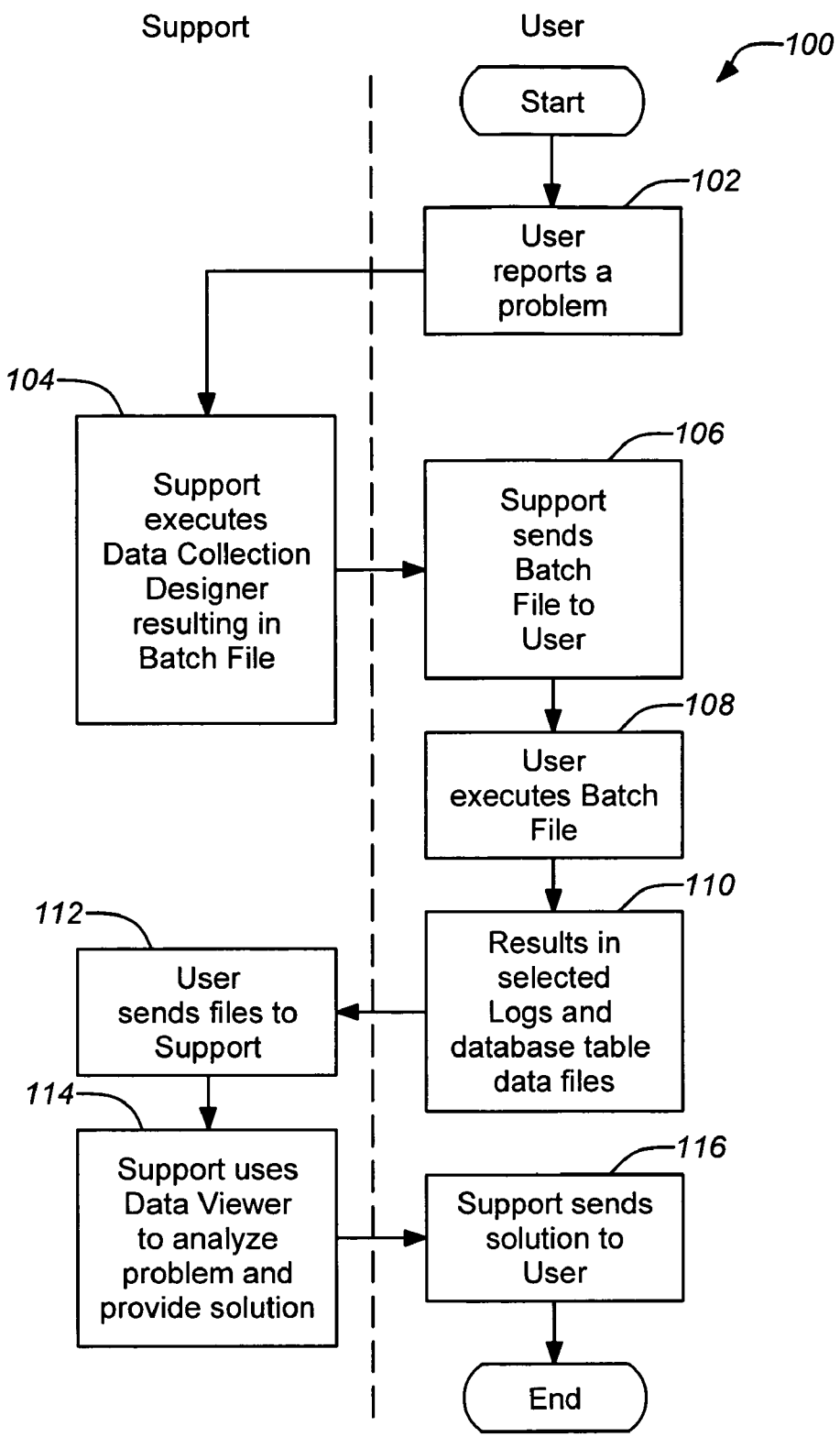
FIG. 1 is a flowchart of an exemplary overall method of data collection and viewing for remote diagnostics.

FIG. 1 is a flowchart of an exemplary overall method 100 of data collection and viewing for remote diagnostics. The method 100 begins in block 102 with a user reporting a computer problem to a remote support technician. The support technician receives the report (and may ask follow up questions) and determines what problem diagnosis data is required from the user computer in order to definitively determine the source of the problem so that a solution can be identified. This understanding is applied in the operation of a data collection designer software program by the support technician in order to generate a customized batch file at block 104. The batch file is designed to collect the required problem diagnosis data in a data file when it is run on user system. Accordingly, the data collection designer program comprises specific information regarding the software application running on the user computer. In block 106 the support technician then communicates the batch file to the user, e.g. through e-mail or ftp download.

The user receives the batch file and then executes it on the user system having the problem in block 108. The batch file then generates the data file including the problem diagnosis data in block 110. In the case where the software application on the user system comprises a database, the data file may include application logs (e.g. event and/or error logs) as well as database tables. The user then communicates the data file back to the support technician for analysis in block 112, e.g. through e-mail or ftp upload.

The received data file may then be viewed through a single data viewer program capable of parsing all the provided data (e.g. application logs and database tables) in block 114 in order to analyze the user problem and identify the solution. In order to review the contents of the data file it is not necessary for the database application to be installed on the support technician's system. After the technician analyzes the contents of the data file a solution is communicated to the user in block 116.

Figure 2A:
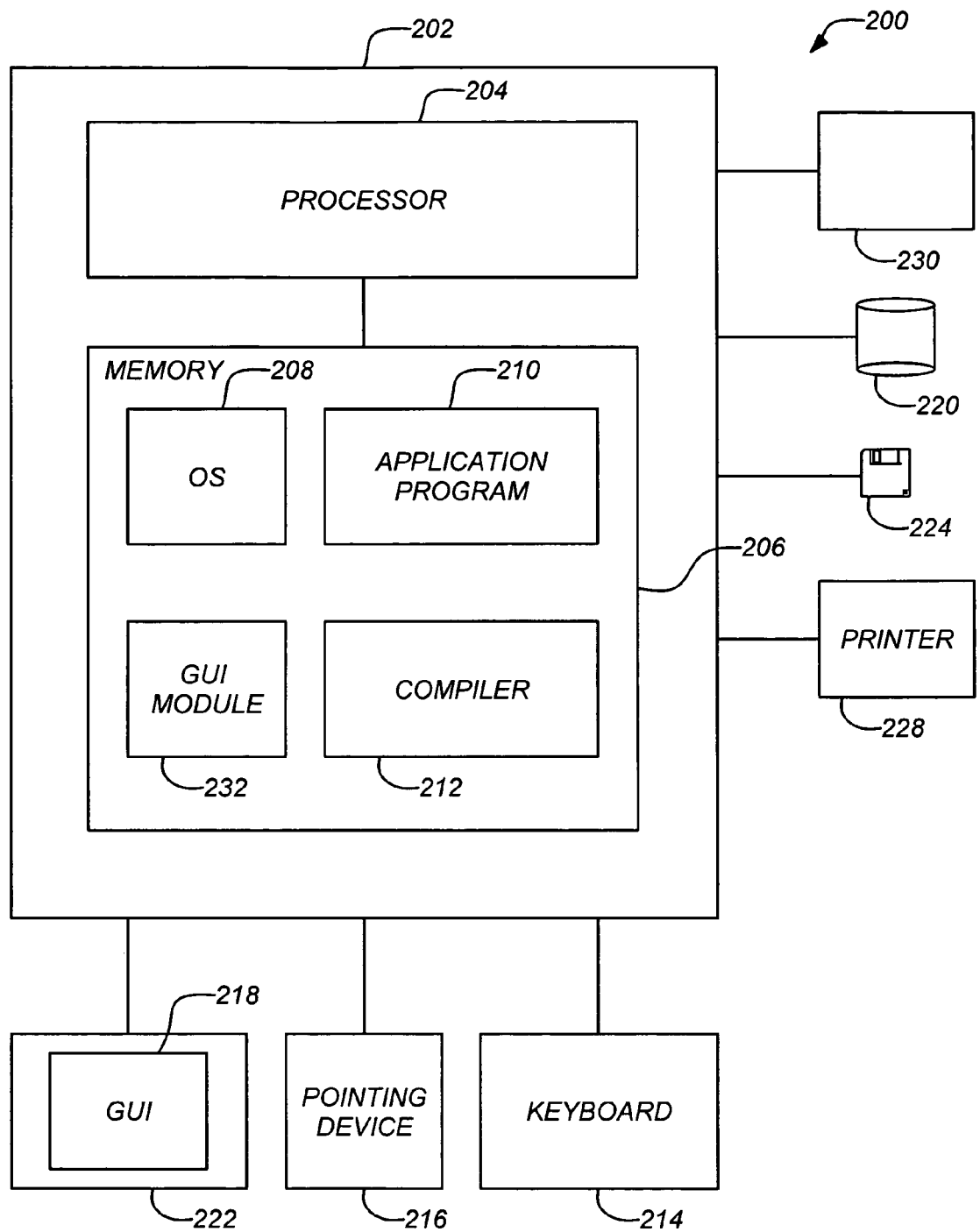
FIG. 2A illustrates an exemplary computer system that can be used to implement embodiments of the present invention.

Embodiments of the invention allow a support technician to define application data (typically configuration and log files) and database tables needed to be collected from a user system based on the problem reported by the customer. Thus, embodiments of the invention enable customization and simplification of a remote diagnostic process for computer problems. For example, embodiments of the invention allow customization of collecting different files and tables for a specific situation through a single collection script. In contrast, the convention technique uses separate batch files to get all the logs or database tables, which may or may not pertain to the customer's specific problem, via separate scripts or processes. In addition, embodiments of the invention may select which database tables to retrieve based on criteria such as date/time, table size, record/column specification, etc. and also may jointly look up multiple tables. Further, embodiments of the invention allow selecting which log files to retrieve based on criteria such as timestamp, file size and format. Accordingly, embodiments of the invention will significantly reduce the problem determination time 2. Hardware Environment FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, the software application 210, or implemented with special purpose memory and processors. The computer 202 also implements a compiler 212 which allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, ethernet card, wireless link or other device for communicating with other computers, e.g. via the Internet or other network.

In one embodiment, instructions implementing the operating system 208, the software application 210, and the compiler 212 are tangibly embodied in a computer-readable medium, e.g., data storage device 220, which may include one or more fixed or removable data storage devices, such as a zip drive, floppy disc 224, hard drive, DVD/CD-rom, digital tape, etc., which are generically represented as the floppy disc 224. Further, the operating system 208 and the software application 210 comprise instructions which, when read and executed by the computer 202, cause the computer 202 to perform the steps necessary to implement and/or use the present invention. Software application 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application 210. Typically, the software application is run on a computer that is part of a distributed computer system comprising a network of computing devices. The network may encompass one or more computers connected via a local area network and/or Internet connection (which may be public or secure, e.g. through a VPN connection), or other known network types as will be understood by those skilled in the art.

Figure 2B:
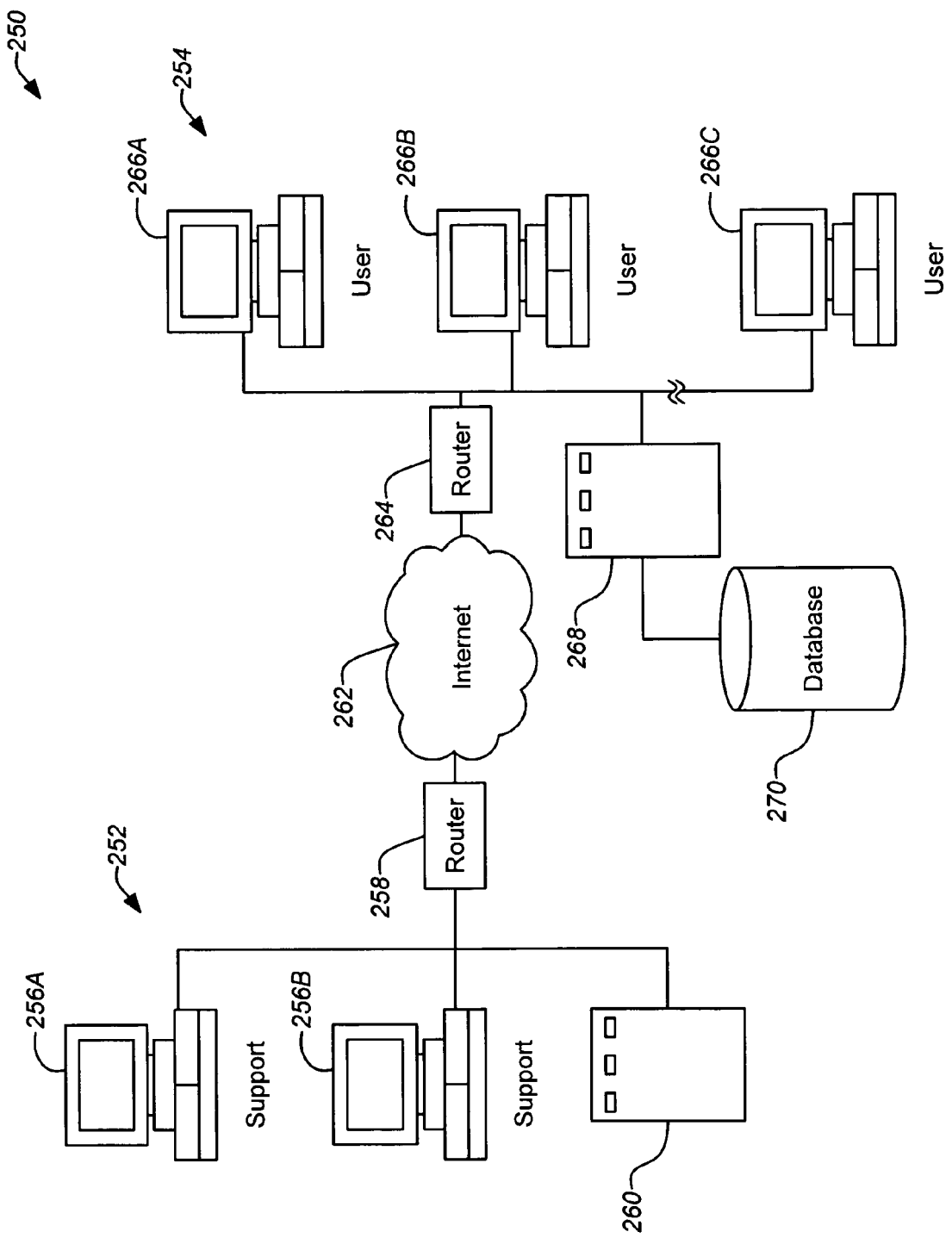
FIG. 2B illustrates an exemplary network 250 of computing devices that can be used with embodiments of the present invention.

FIG. 2B illustrates an exemplary network 250 of computing devices that can be used with embodiments of the present invention. In this example, the network 250 generally comprises a support site 252 that is remotely located from the user site 254. The support site may comprise one or more support computers 256A, 256B that are operated by support technicians. The support computers 256A, 256B are employed to run the support software including a data collection designer software program to generate the batch file as well as a data viewer as previously described in FIG. 1. To facilitate convenient file transfers the support computers 256A, 256B at the support site 252 may be coupled the user site 254 through a network 262 (e.g. the Internet) by a network device 258, such as a router. In addition, the support site 252 will typically include a server 260 (which may be a mainframe computer) coupled to the support computers 256A, 256B.

Similarly, the user site 254 is coupled to the network 262 through a second network device 264. The user site 254 may comprise a network of user computers 266A-266C (e.g. workstations) coupled to a user server 268 (e.g. a mainframe computer). In one exemplary system, the user server 268 hosts a database 270 and the user computers 266A-266C and the user server 268 run a software application that operates the database. In other words, the software application includes the database.

It is important to note that, although it is preferable, it is not necessary for the support site 252 and the user site 254 to have a network link to each other (e.g. the Internet). However, in applications where the problem involves a database, the support technician should ideally have access to the database (e.g. through a network using normal security protocols) as part of process of generating the custom batch file; thereby the technician can directly identify the database fields, etc. to specify in the batch file. The support technician may develop the batch file based on a support phone call from the user. The batch file may then be delivered to the user site by any means, e.g. e-mail, ftp, or even mail. Similarly, the data file output from the batch file being run on the user computer can be returned to the support site by any means.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Methods of Collecting and Displaying Data for Remote Diagnostics

Embodiments of the invention make customized data collection from any computer for a specified software application more convenient and efficient, particularly for the user. Accordingly, embodiments of the invention have a number of advantages, particularly in the case where the software application includes a database. First, the individual who sets up the batch file (typically the remote support technician), via a GUI, has only one interface to deal with that will arrange to collect both database tables and application data in a single process when the batch file is executed. In addition, the individual that actually runs the batch file to collect data (typically, the user at the problem system) does not need to know details of how the database or the application operate. Furthermore, all collection data may be saved in a single data file, e.g. an archive, for easy transmission to the support technician. Yet another advantage is that, using a single data viewer the support technician who interprets the collected data, does not need the database installed on the support system and can view both database and application data in one place through a single GUI. Two distinct software applications may be implement embodiments of the invention, a data collection designer software program and a data viewer application.

Figure 3A:
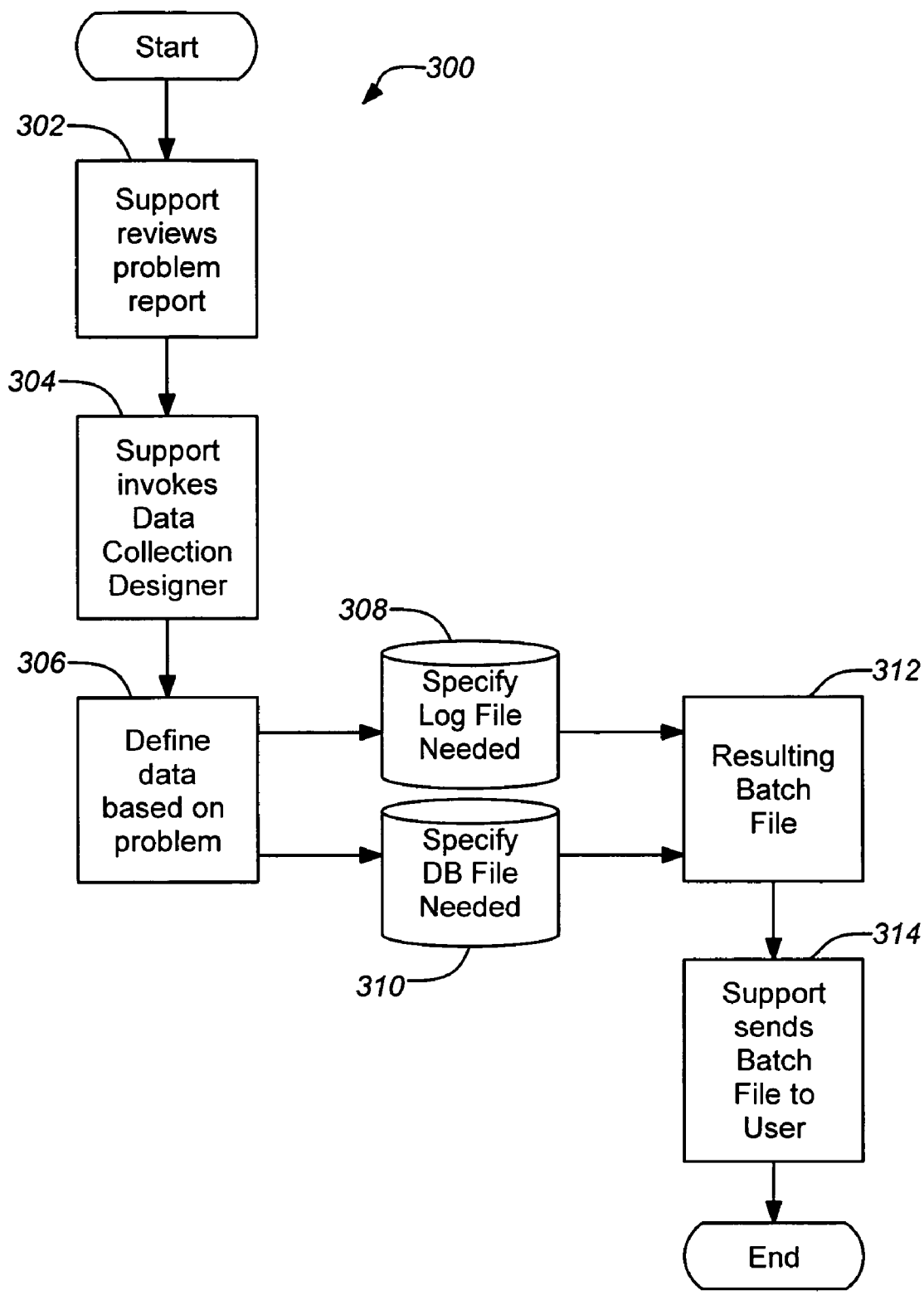
FIG. 3A is a flowchart of an exemplary detailed method of customizing data collection for remote diagnostics.

FIG. 3A is a flowchart of an exemplary detailed method 300 of customizing data collection for remote diagnostics. The detailed method 300 may be implemented by a data collection designer software program and corresponds to block 104 of the overall method 100 of FIG. 1. The method 300 begins with the support technician reviewing a problem report from a user at block 302. This may also include a follow up interview by the technician to fully understand the problem on the user computer. In block 304, the support technician invokes the data collection designer, the software application for generating a customized batch file, the executable script that will generate a data file comprising problem diagnosis data when run on the user computer.

Using the data collection designer and the problem report from the user, the support technician defines the problem diagnosis data that will be required to analyze the problem on the user computer. Using the program interface, the technician may specify application files that will be required, e.g. event and/or error logs, in block 308. In addition, in block 310 the technician may also specify database data, e.g. fields or database tables, that will be needed (if the problem software application includes a database). In block 312 the output of the data collection designer application is a batch file customized to collect all the specified problem diagnosis data when it is run on the user system. The batch file is then communicated back to the user in block 314. The user later returns the data file including the problem diagnosis data to the support technician for analysis after it is generated on the user computer by the batch file.

Figure 3B:
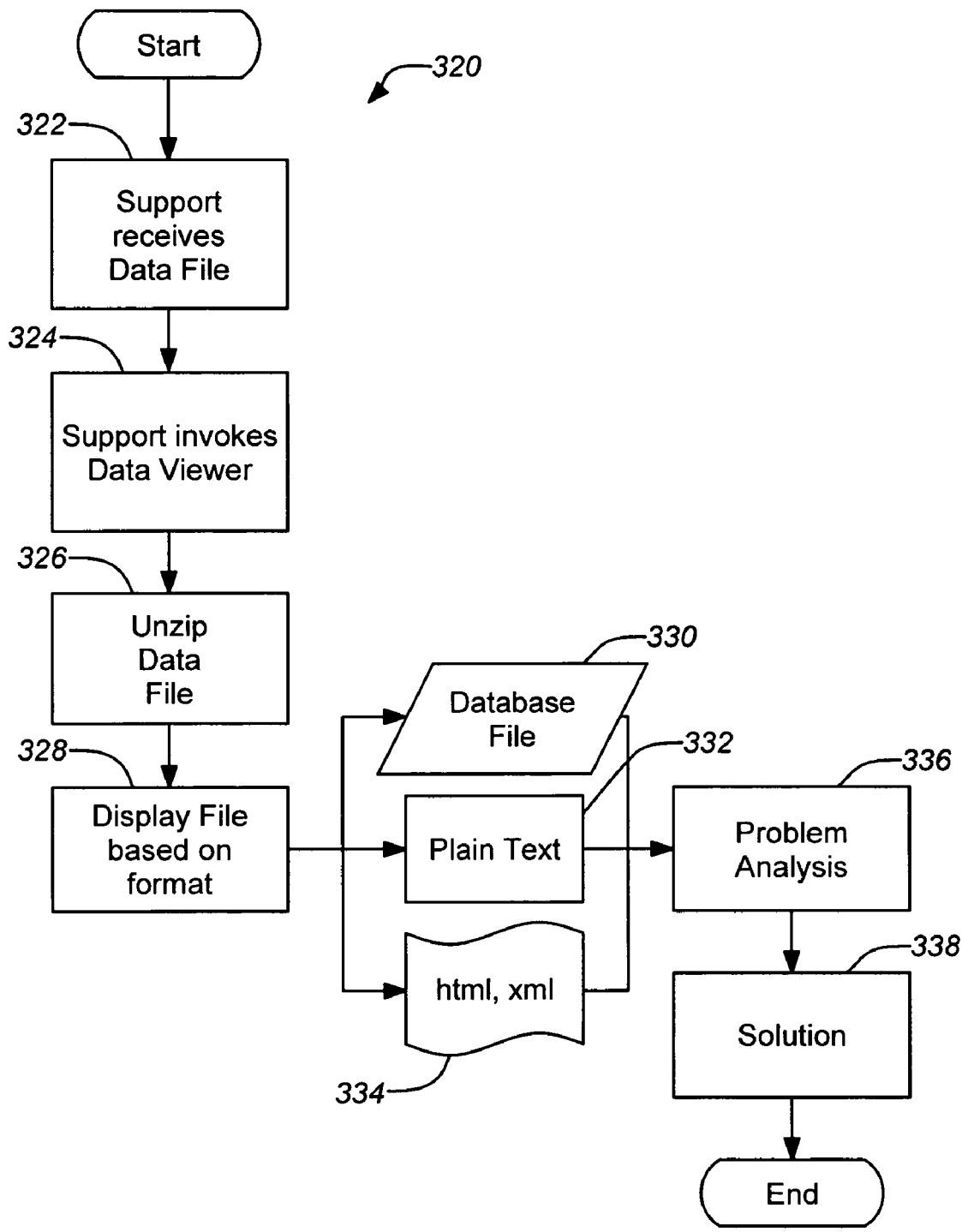
FIG. 3B is a flowchart of an exemplary detailed method of problem diagnosis data viewing for remote diagnostics.

FIG. 3B is a flowchart of an exemplary detailed method 320 of problem diagnosis data viewing for remote diagnostics. The detailed method 320 may be implemented by a data viewer application and corresponds to block 114 of the overall method 100 of FIG. 1. The support technician receives the data file in block 322, e.g. via e-mail or ftp. Next in block 324, the support technician runs the data viewer application. To facilitate manipulation and transfer from the user to the support technician, the data file is preferably an archive, e.g. a zip file or other format that may include data compression. Accordingly, in block 326 the data file may be opened, e.g. uncompressed or unzipped. Next, in block 328 the problem diagnosis data of the data file are displayed in the viewer based on the data format. The data viewer includes a parsing function that accommodates all necessary data formats. For example, blocks 330, 332 and 334 represent data viewing of a database file (e.g. a string delimited format), plain text, and html or xml, respectively. By viewing the problem diagnosis data, the support technician then performs the problem analysis in block 336 and identifies the appropriate solution in block 338. Some exemplary embodiments of the data collection designer software program and data viewer program are described hereafter.

4. Exemplary Data Collection Designer Software Program and Data Viewer

In an exemplary embodiment, collection of database and log file data is performed with a data collection designer software program. The program is used to customize gathering of database data and logs for problem determination. The program can be used by engineering or support technicians to retrieve customer data for analysis of a computer problem. In addition, a data viewer program is provided to display collected data and allow searching and sorting capabilities on the problem diagnosis data.

Figure 4A:
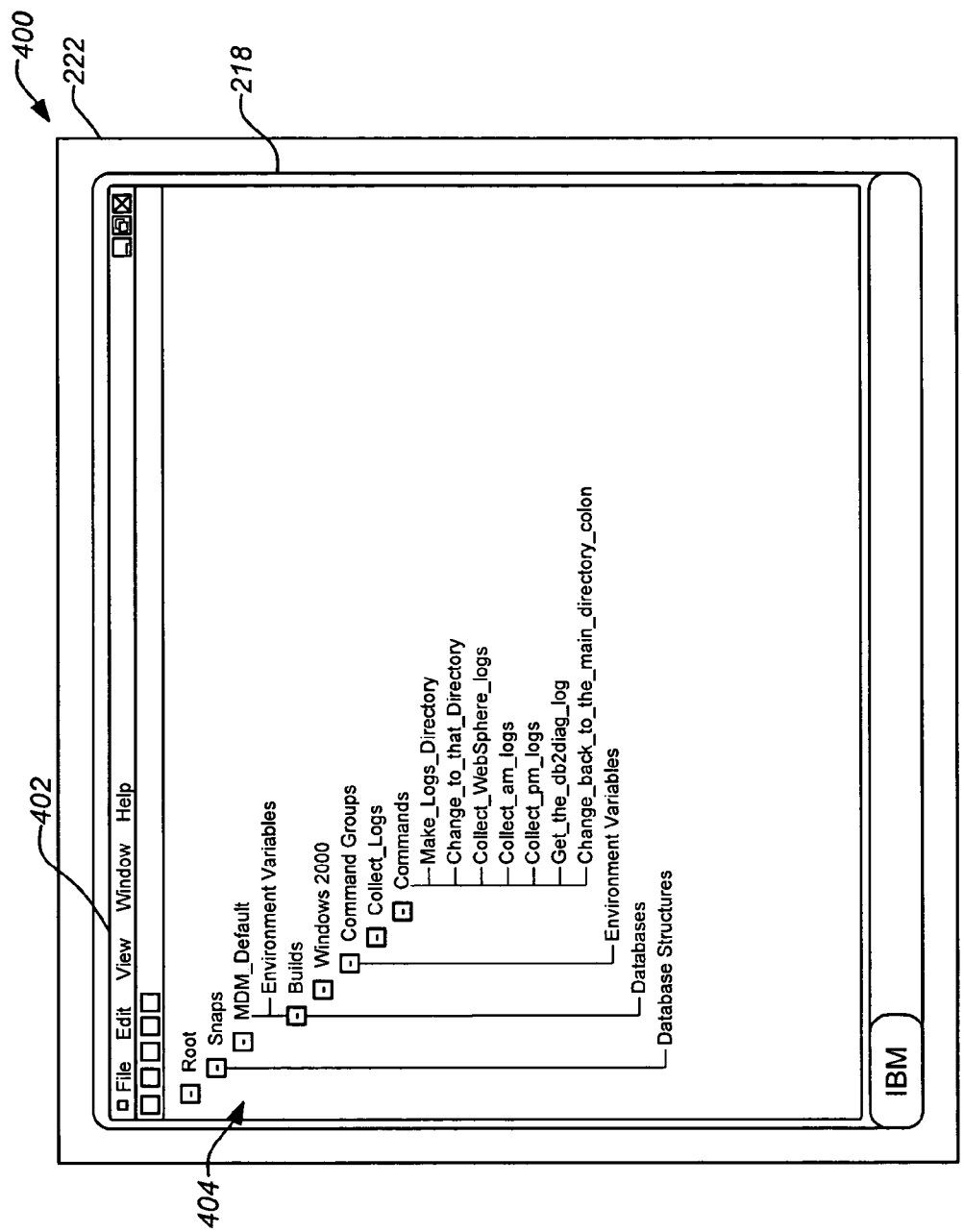
FIG. 4A illustrates an interface for an exemplary computer application for generating a custom data collection batch file.

FIG. 4A illustrates an interface 400 for an exemplary computer application for generating a custom data collection batch file. The computer application comprises a data collection designer software program having a GUI 402 for the support personnel to define logs and database tables needed to be collected from a user system. The necessary variables may be specified by the support technician in a tree structure 404 as shown. Using the program, the support technician is able to specify particular data of interest. For example, only specific tables may be needed from the database for problem determination and perhaps only certain fields within a table may be needed. Further it may be that only some records (logs or database data) within a time period are needed. The program allows for customization of collecting different files and tables for a user-specified problem.

The application is versatile and allows the creation of data collection batch files (i.e. scripts) for different platforms (e.g. Windows and Linux). Furthermore, the application may be implemented to generate batch files operable with a variety of databases, e.g. through the Windows ODBC driver. After the batch file is properly specified in the interface 402 by the support technician, the application is prompted to generate the customized batch file. The batch file operates on the user system to collect the problem diagnosis data into a single archive file (e.g. a zip file) to be sent back to the support technician for analysis. An example process of operating the data collection designer software program is provided as follows.

1. Setup a database connection (e.g. in Windows ODBC panel).
2. Run the data collection designer software program.
   a. Define a database to access: Create a new "Database Structure".
   b. Define files to copy.
      i. Create a new "Build" (or use default "Windows_2000")
      ii. Define actual commands to copy files: Create a new "Command Group" or use default "Collect_Logs".
      iii. Enter the copy command with files to copy. (Tip: follow and modify the example in the default.)
   c. Define a database table data to extract.
      i. Define a database specified in step 1. (Be sure to enter the SQL connect command: "connect to dbname user xxxx using yyyy" in the "Connect String" entry field.)
      ii. Define a table to extract: Create new "Tables".
         1. General tab: Enter a user-given name; and name of table (under "Database Table Name" entry field).
         2. Field tab: Allows reordering of column output of table fields.
         3. Lookup tab: Allows "join" lookup of 2 table fields.
         4. Condition tab: Allows selective extract of table records based on a date field in the table.
      iii. Delete table columns in the extracted output.
         1. Expand "Fields" will show all the fields in the table.
         2. Right mouse click on a field and select "Delete . . . " deletes that column in the extracted output of that table.
   d. Go to File->Save As: to save the current setup profile.
   e. Create a script that contains the files and database to extract.
      i. Right click on a "Build", e.g. "Windows_2000", and select "Save Script".
         1. Enter name of script file in "Set Script File", e.g. "c:\temp\test.bat".
         2. Check the "Select a template file?" checkbox.
         3. Click the "Set Template File." button.
         4. Select "win2kbasic.template" file, then click the "open" button.
         5. Click "ok" to save the script file (c:\temp\test.bat) and exit the Save Script popup box.
3. The newly created test.bat file contains all the code to extract files and tables and put them into a zip file.
4. To run the script, the user opens a Windows command prompt window and enter the name of the script followed by name of the zip file: c:\temp\test output.zip.

The foregoing process is provided as an example only to illustrate operation of an exemplary embodiment. Those skilled in the art will recognize many modifications may be made to this software process without departing from the scope of the present invention.

Figure 4B:
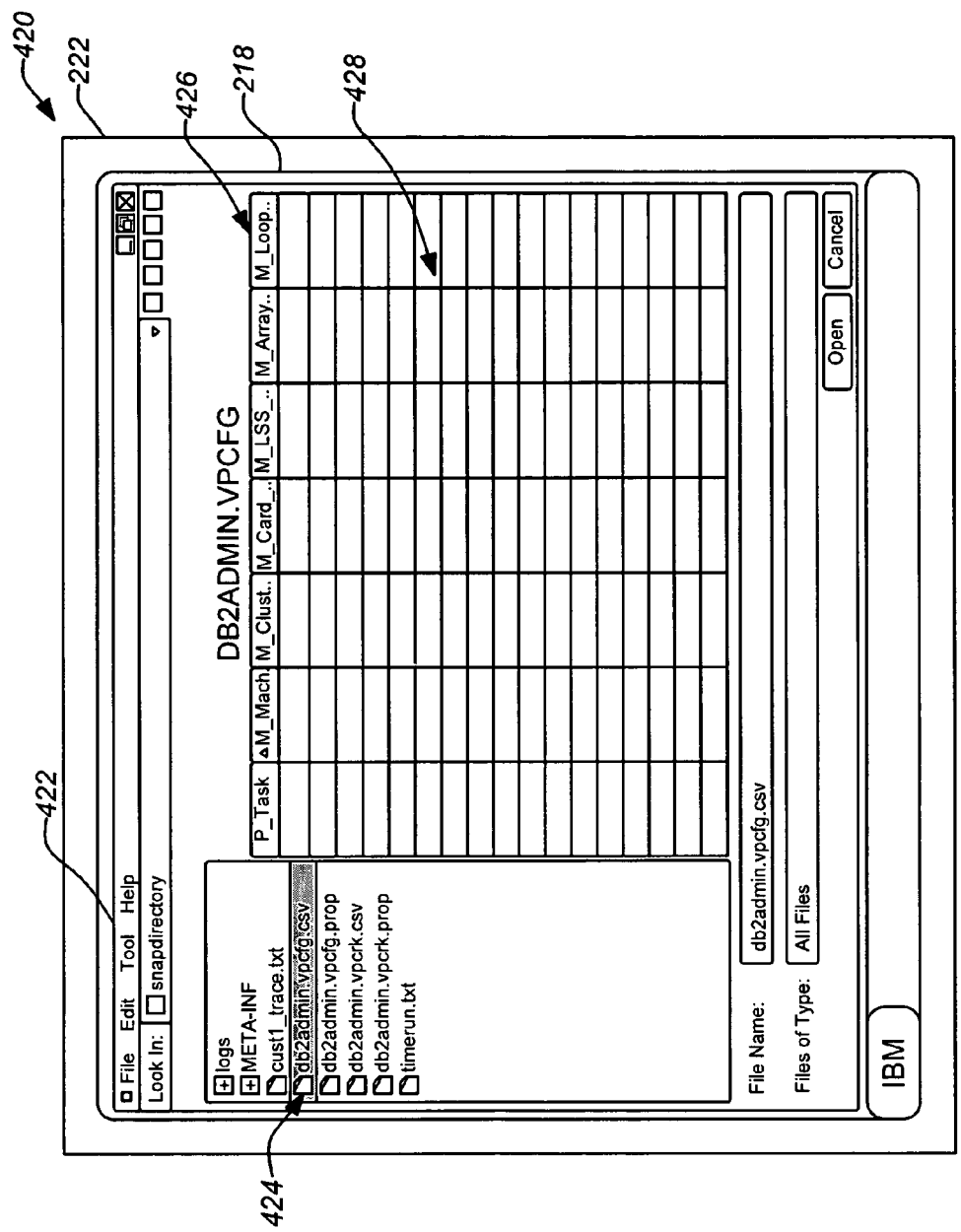
FIG. 4B illustrates an interface for an exemplary computer application for viewing a plurality of data types collected with a custom data collection batch file.

FIG. 4B illustrates an interface 420 for an exemplary computer program for viewing a plurality of data types collected with a custom data collection batch file. The program unzips and displays data previously collected by the batch file generated by the data collection designer software program. The viewer GUI 422 comprises a pane 424 for viewing the specific files (e.g. logs and database tables) within the data file archive. A specific file is selected in the pane 424 and the contents 428 are displayed in another pane 426. The support technician has all the pertinent information related to the problem in a single place, viewed in a single application and therefore may analyze the problem much more efficiently. In addition, the support technician does not need to install database program to display database tables in the archive.

Furthermore, the viewer application can include known viewer functions such as text and binary searches, e.g. for log files and copy/paste/replace, filter in/out lines in a file. It may also allow sorting of database table columns, searching of text/binary/date, copy/paste/replace, and cross reference of tables operations. Other functions may be added as necessary to facilitate review and analysis by the support technician. An example process of operating the data viewer is provided as follows. Once the output.zip is created in the example process above, the support technician can then run the viewer to examine the contents of the zip file.

1. Run data viewer.
   a. Expand output.zip created from batch file.
      i. Next to "Look in" or "Up one level" icon click it to show the directories.
      ii. Click on directory on the left pane to go deeper into directories.
      iii. To unzip ouput.zip file, select the zip file, then click on Tool->Unzip.
      iv. A new directory "output" is created with the zip file expanded in it.
   b. To view a text file, click on a text file in the left pane.
   c. To view a database table file, click on a .csv file in the left pane.
   d. To find or replace text in a text file, in the text area, right click->Find/Replace.
   e. To sort database table:
      i. To sort a single column, click the Column Name cell in the table, click once to sort the column in ascending order, click again to sort the column descending order.

ii. To sort multiple columns, right mouse click on any Column Name cell->Popup menu->select Second Sort, and choose the columns to be sorted.

f. To find a word or string value in a database table column: right mouse click on the column name cell->Search->"Search" dialog box->select column name->input value.

In one example, both the data collection designer software program and the viewer application may be installed as separate applications on Windows with InstallShield. Typically, the data collection designer software program may be installed on the same platform where the database is residing to allow the support technician to conveniently identify the necessary tables to specify in the batch file. However, a remote database connection may also be employed, e.g. through Windows ODBC. In this case, the Windows ODBC driver should be connected prior to running data collection designer software program so the database can be accessed. In one example, the viewer application may conveniently implemented with Java.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A method comprising the steps of:
    running a data collection designer software program on a support computer to create a customized batch file, the customized batch file including program instructions for generating a data file comprising problem diagnosis data from a database of a database software application running on a user computer, where running the data collection designer software program on the support computer comprises:
        first specifying the problem diagnosis data as specific tables from the database and application files of the database software application running on the user computer; and
        then generating the customized batch file for collecting the specific tables and application files from the database of the database software application running on the user computer; and
    communicating the customized batch file to the user computer for execution on the user computer to generate the data file, where the data file comprises a single archive file including the specific tables from the database and the application files;
    wherein a data viewer is used with the single archive file to view the specific tables from the database and the application files for diagnosing a problem involving the database of the database software application.

2. The method of claim 1, further comprising receiving the data file from the user computer; and
    invoking the data viewer to display the problem diagnosis data in the data file.

3. The method of claim 1, wherein the database tables are collected from the database based on criteria selected from the group consisting of time, table size, record specification, and column specification.

4. The method of claim 1, wherein the problem diagnosis data is in a format viewable without the software application running on a viewing computer.

5. The method of claim 1, further comprising executing the customized batch file on the user computer to create the data file.

6. The method of claim 1, wherein the problem diagnosis data comprises information stored in one or more application files associated with the software application.

7. The method of claim 6, wherein the problem diagnosis data from the one or more application files is collected based on criteria selected from the group consisting of time, file size, and format.

8. The method of claim 6, wherein the one or more application files comprise a event log recording a state of the application software.

9. The method of claim 6, wherein the one or more application files comprise an error log including information related to errors occurring in running the software application.

10. A computer program embodied on a computer readable storage medium, comprising:
    program instructions for running a data collection designer software program on a support computer to create a customized batch file, the batch file including program instructions for generating a data file comprising problem diagnosis data from a database of a database software application running on a user computer, where running the data collection designer software program on the support computer comprises:
        first specifying the problem diagnosis data as specific tables from the database and application files of the database software application running on the user computer; and
        then generating the customized batch file for collecting the specific tables and application files from the database of the database software application running on the user computer; and
    program instructions for communicating the customized batch file to the user computer for execution on the user computer to generate the data file, where the data file comprises a single archive file including the specific tables from the database and the application files;
    wherein a data viewer is used with the single archive file to view the specific tables from the database and the application files for diagnosing a problem involving the database of the database software application.

11. The computer program of claim 6, further comprising:
    program instructions for receiving the data file from the user computer; and
    program instructions for invoking the data viewer to display the problem diagnosis data in the data file.

12. The computer program of claim 6, wherein the database tables are collected from the database based on criteria selected from the group consisting of time, table size, record specification, and column specification.

13. The computer program of claim 6, wherein the problem diagnosis data is in a format viewable without the software application running on a viewing computer.

14. The computer program of claim 6, wherein the customized batch file is executed on the user computer by a user to create the data file.

15. The computer program of claim 6, wherein the problem diagnosis data comprises information stored in one or more application files associated with the software application.

16. The computer program of claim 15, wherein the problem diagnosis data from the one or more application files is collected based on criteria selected from the group consisting of time, file size, and format.

17. The computer program of claim 15, wherein the one or more application files comprise a event log recording a state of the application software.

18. The computer program of claim 15, wherein the one or more application files comprise an error log including information related to errors occurring in running the software application.

* * * * *

UNITED STATES PATENT AND TRADEMARK OFFICE
CERTIFICATE OF CORRECTION

PATENT NO.      : 7,647,527 B2                      Page 1 of 1
APPLICATION NO. : 11/329899
DATED           : January 12, 2010
INVENTOR(S)     : Duan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 626 days.

Signed and Sealed this

Sixteenth Day of November, 2010

David J. Kappos
*Director of the United States Patent and Trademark Office*